United States Patent [19]
McNabb

[11] Patent Number: 5,487,258
[45] Date of Patent: Jan. 30, 1996

[54] WATER HYACINTH REMOVAL APPARATUS AND METHOD

[76] Inventor: Thomas J. McNabb, 1115 Silverhill Ct., Lafayette, Calif. 94549

[21] Appl. No.: 347,766

[22] Filed: Nov. 30, 1994

Related U.S. Application Data

[63] Continuation-in-part of Ser. No. 238,103, May 4, 1994, abandoned.

[51] Int. Cl.$^6$ ............................................. A01D 45/08
[52] U.S. Cl. ................................................................. 56/9
[58] Field of Search ..................... 56/8, 9, 16.4; 198/512

[56] References Cited

U.S. PATENT DOCUMENTS

| | | |
|---|---|---|
| 3,286,447 | 11/1966 | Grinwald . |
| 3,449,892 | 6/1969 | Huff . |
| 3,498,033 | 3/1970 | Huff . |
| 3,540,194 | 11/1970 | Chaplin . |
| 3,546,858 | 12/1970 | Chaplin . |
| 3,596,444 | 8/1971 | Beattie . |
| 3,866,396 | 2/1975 | Meyer . |
| 3,884,018 | 5/1975 | Chaplin . |
| 4,520,616 | 6/1985 | Stewart et al. . |
| 5,083,417 | 1/1992 | Jeronimidis et al. ...................... 56/9 |

*Primary Examiner*—Michael Powell Buiz
*Attorney, Agent, or Firm*—Townsend and Townsend and Crew

[57] ABSTRACT

A system is disclosed for the harvest of water hyacinths. The floating hyacinths are conveyed from their surface disposed growing disposition to a grinder. Grinding occurs with liberation of large amount of the plant contained water and exposure of the hyacinths' fibrous plant material which only becomes suitable for baling after grinding has occurred. Thereafter, the hyacinths' fibrous material is placed into a conventional baler where the now ground plant material adheres when baled into a cohesive mass. The baled fibrous material is then disposed of. For example, the baled material can be attached to rope, and pushed into the water with bales being serially attached one to another via the rope. One end of the rope is led ashore. Thereafter, the serially tethered bales are pulled floating from harvesting barge to a shore location where conventional removal of the compacted and baled fibrous biomass can occur. In one embodiment, the bales are further compacted on the shore before transport for fuel or other uses. In another embodiment, a shore mounted facility accumulates, grinds and bales the water hyacinth. Weighting of the bales for disposal by sinking is disclosed.

14 Claims, 3 Drawing Sheets

WATER HYACINTH REMOVAL APPARATUS AND METHOD

This application is continuation-in-part of Ser. No. 08/238,103 filed May 4, 1994 now abandoned.

This invention relates to the mechanical removal of water hyacinths from the surface of water, grinding, baling, and transporting the hyacinths to shore where removal can occur.

BACKGROUND OF THE INVENTION

Water hyacinths (*Eichhornia crassipes*) are a free-floating or rooted in mud plant or weed which can completely cover fresh water lakes, harbors, sloughs, and other essentially relatively occluded fresh water bodies. These plants produce in excess of 250,000 pounds of biomass per acre. Further, under optimum growing conditions, the surface area covered by such plants doubles every 10 days. As the densities and growth rate of the plant are so high, mechanical methods of plant removal have not been economically successful.

The leaves of the water hyacinth are large and broadly lance-like, extending from a generally inflated stalk. The flowers are blue, violet or white. The roots are dark and fibrous. Leaf blades may be up to 8 inches long and 2–6 inches wide. The plant reproduces either by seed or fragmentation. It is common in the tropical and subtropical fresh water bodies of the world—and in California, Florida, Texas and the Gulf Coast region of the United States.

Where removal has been undertaken, harvesting barges have contained the harvested plant. When filled with harvested plant, the harvesting barges commute to shore, unload, and return to the harvest site. This results in harvest interruption and transit time loss. As the harvesting barges and their associated crews are relatively high in hourly cost, mechanical harvesting has generally not been economical.

Chemical controls have been tried. Unfortunately, these techniques have undesirable side effects with their toxins. This being the case, chemical control comes under increasing scrutiny with limited use.

An economical system for removal of the hyacinths remains to be disclosed.

SUMMARY OF THE INVENTION

A system is disclosed for the harvest of water hyacinths. The floating hyacinths are conveyed from their surface disposed growing disposition to a grinder. Grinding occurs with liberation of large amount of the plant contained water and exposure of the hyacinths' fibrous plant material which only becomes suitable for baling after grinding has occurred. Thereafter, the hyacinths' fibrous material is placed into a conventional baler where the now ground plant material adheres when baled into a cohesive mass. The baled fibrous material is then disposed of. For example, the baled material can be attached to rope, and pushed into the water with bales being serially attached one to another via the rope. One end of the rope is led ashore. Thereafter, the serially tethered bales are pulled floating from harvesting barge to a shore location where conventional removal of the compacted and baled fibrous biomass can occur. In one embodiment, the bales are further compacted on the shore before transport for fuel or other uses. In another embodiment, a shore mounted facility accumulates, grinds and bales the water hyacinth. Weighting of the bales for disposal by sinking is disclosed.

The disclosed method increases the efficiency of water hyacinth removal because the disclosed baling allows the harvested hyacinth to be transported to shore by simply floating the bales. Consequently, the harvesting vessel or attending barges do not have to continually commute between the harvest site and shore for disposal of harvested hyacinths.

BRIEF DESCRIPTION OF THE DRAWINGS

Other objects, features and advantages of this invention will become more apparent after referring to the following specification and attached drawings in which.

DESCRIPTION OF THE PREFERRED EMBODIMENT

Figure 1:
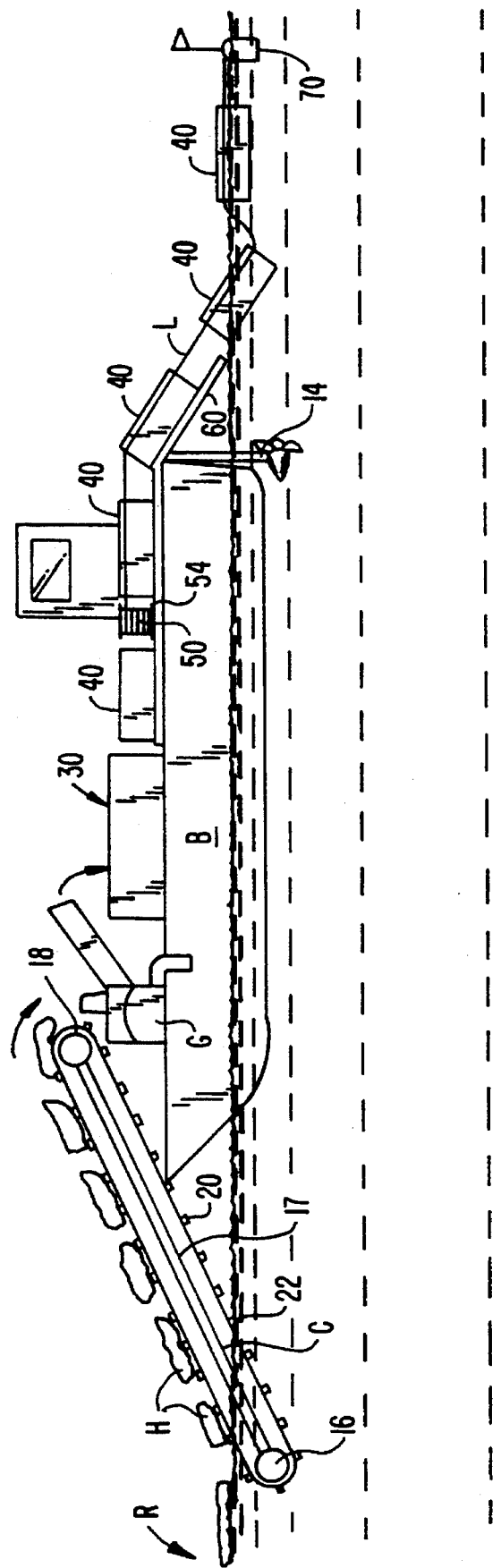
FIG. 1 is side elevation taken through a barge harvesting water hyacinth including a conveyor for lifting the water floating plants on board the barge to a grinder; the grinder shown discharging the ground plant bodies to a baler for baling; and, the formed bales being serially tethered to a line and jettisoned from the barge for towing to a shore disposal site.

Referring to FIG. 1, barge B powered by outboard 14 is shown harvesting water hyacinths H from a typical raft R of such hyacinths. An endless conveyor C on barge mounted frame 17 has a submerged reversing pulley 16 and an upper off loading pulley 18. Endless belt 20 includes horizontal runners 22 which extend well below water hyacinth H growing in typical rafts R. Horizontal runners 22 entangle and lift water hyacinths H free of their floating, surface exposed disposition on the water W. Water hyacinths H are then deposited to grinder G.

Grinder G has been found to be crucial to the disclosed process. Specifically, grinder G causes some water to be removed from the harvested water hyacinths H and reduces the plants to a fibrous biomass which only then becomes suitable for baling. Experimentation has disclosed the direct baling of water hyacinths H is unsatisfactory. While such direct baling reduces some of the water content, the baled and un-ground water hyacinths H merely compress in baler 30 but do not adhere one to another. As a result, when compressed—and not ground—water hyacinths H are baled, then tend to float apart and not remain with the mass of bales 40. Accordingly, grinding is required.

The degree of required grinding can be easily understood. Water hyacinth includes leaf and stem matter which contain large amounts of water and air. This leaf and stem matter when intact essentially prevents solid baling. This being the case, sufficient grinding must occur to cause the leaf and stem matter into a fibrous mass—where the leaf and stems no longer are recognizable as such. Instead, the leaf and stems are a unitary, fibrous mass.

Grinders capable of producing this result are commercially available. For example, a grinder sold under the name SSI can be obtained from SSI Shredding Systems, Inc. of Wilsonville, Oreg. These grinders vary in size, and can be obtained and sized for the fiber reducing function described above.

Once baling has occurred, bales 40 of water hyacinths H are tethered to line L passed from reel 50. Typically, as bales 40 are removed from baler 30, they are pulled along roller conveyer 54 to off loading ramp 60. At off loading ramp 60 they gradually enter water W where they are illustrated in FIG. 1 tethered by line L to marker float 70. It will thus be understood that various "strings" of such marked and floating bales 40 all tethered by line L can be produced, towed ashore for processing as further illustrated in FIG. 2.

Bales 40 have sufficient density to float. Further compression of bales 40 is delayed for shore side compaction for further removal of liquid absorbed by bales 40.

Figure 2:
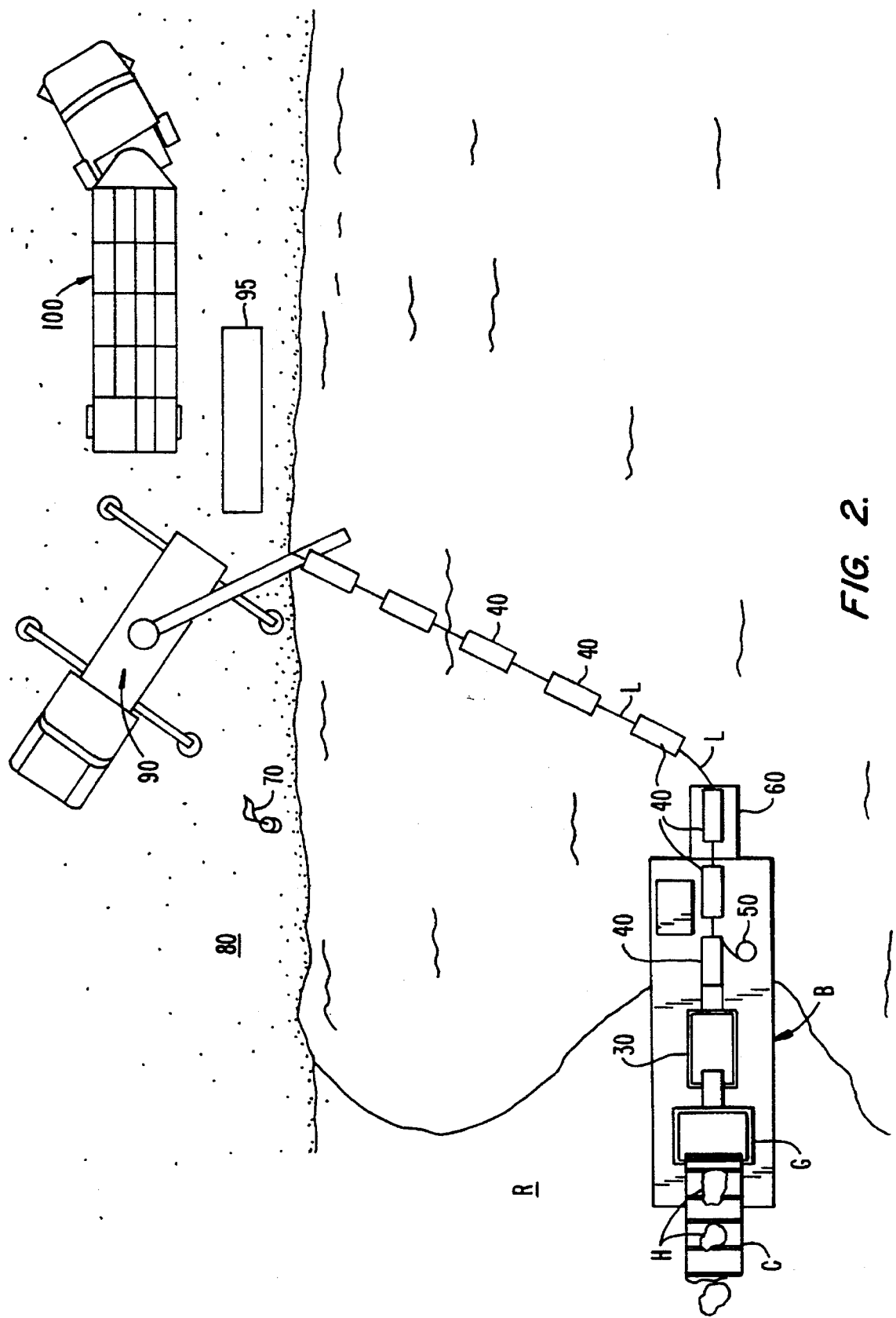
FIG. 2 is a plan view of the harvest of water hyacinths from a hyacinth raft growing in an essentially occluded location illustrating a nearby shore disposal site with the floating bales being removed from the water and further compacted before transport.

Referring to FIG. 2, it can be seen that marker float 70 has been led ashore to bank 80 of a river. Truck mounted crane 90 loads bales 40 to compactor baler 95 which provides a further 4 to 1 reduction to bale size. Thereafter, compacted bales 40' are loaded to flat bed truck 100 for final disposal.

Regarding such disposal, it is noted that compacted bales 40' have a fuel content exceeding that of walnut shells. That being the case, it is hoped that the disclosed process of mechanical harvest can at least yield a fuel by-product after suitable drying of compacted bales 40'.

It will be understood that compactor baler 95 is not required. It is sufficient for the practice of this invention if line L tethered bales 40 are merely hauled ashore for disposal.

Figure 3:
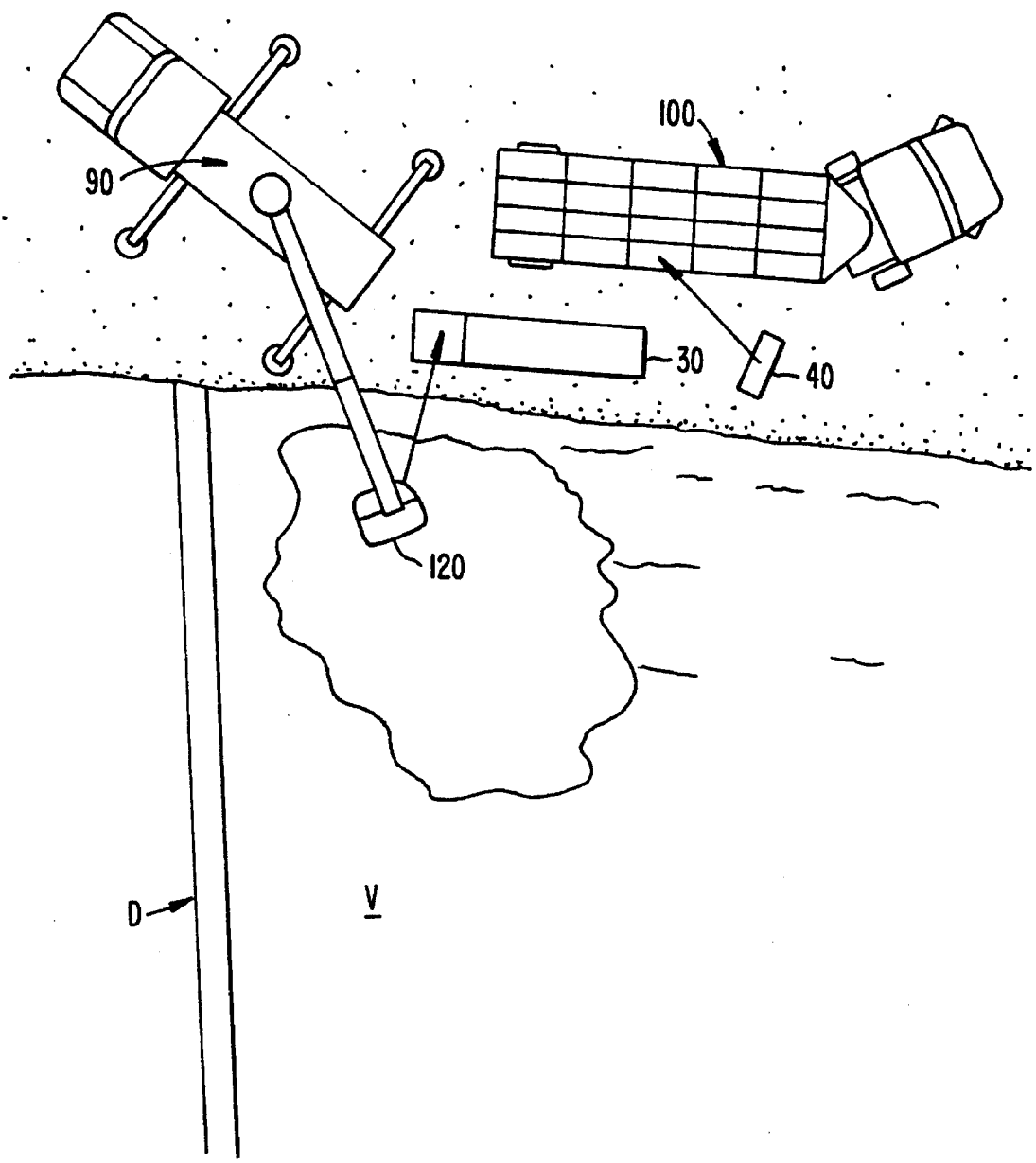
FIG. 3 is a view of a shore mounted station and grinder for baling water hyacinths; and, FIG. 4 is a schematic of a baler illustrating the placement of a weighted mass centrally of the bale for causing the bale to sink relative to water.

Referring to FIG. 3, river V is shown dammed by dam D. As is common, water hyacinth H accumulates at dam D. It will be understood that this schematic is representative of a broad number of situations. For example and most pertinently, dam D can be representative of water pumping station—in which case water hyacinth H will be systematically drawn to dam D.

According to this disclosure, truck mounted crane 90 has clam shell bucket 120 feeding baler 30. Baler 30 discharges bales 40, which bales are then loaded to truck 100 for transport and disposal.

Figure 4:
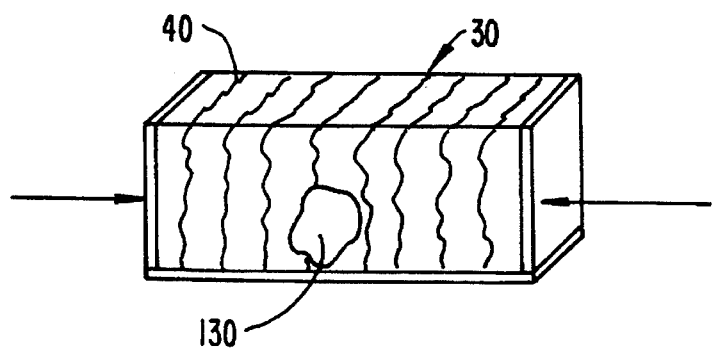

Referring to FIG. 4, baler 30 is shown having sand bag 130 added during accumulation of ground and shredded water hyacinth H. Sand bag 130 is a weight sufficient to overcome buoyancy of bales 40 when floated. Resulting bales 40 will then sink.

It should be understood that any form of adding sufficient weight to bales 40 will suffice for the practice of this portion of the invention. It is only preferred that weighting interior of the formed bale occur so that other modes of bale attachment are obviated.

It is to be noted that this form of bale disposal follows the natural evolution of water hyacinth H. In the natural course, water hyacinth H sinks and decomposes. Here, such sinking and decomposing only changes in that it occurs in the baled state.

What is claimed is:

1. Apparatus for the removal of water hyacinths growing from a floating disposition on water comprising:

a hull for water borne support of said apparatus;

a conveyor support on said hull having a first end submerged, a second end elevated to level of said barge, and a discharge adjacent said second end;

means for moving said conveyor to convey water hyacinths from said submerged end to said discharge end;

a grinder supported on said hull and positioned at said discharge end of said conveyor, said grinder for receiving whole water hyacinth and causing severance of said water hyacinth from a unitary plant to a fibrous state wherein said plant constitute a fibrous mass with leaf and stalk matter shredded; and, a baler supported on said hull for receiving and baling said fibrous mass with said leaf and stalk and compacting said fibrous leaf and stalk mass into bales.

2. Apparatus for the removal of water hyacinth growing from a floating disposition on water according to claim 1 and wherein:

means for tethering said bales serially upon discharge from said baler; and, means for jettisoning said tethered bales whereby a plurality of said bales are serially attached one another in a floating disposition.

3. Apparatus for the removal of water hyacinth growing from a floating disposition on water according to claim 2 and wherein:

said means for tethering said bales includes a floating marker.

4. A method for the removal of water hyacinth growing from a floating disposition on water comprising:

providing a hull for water borne support of said apparatus;

providing a conveyor supported on said hull having a first end submerged, a second end elevated to level of said barge, and a discharge adjacent said second end;

moving said conveyor to convey water hyacinth from said submerged end to said discharge end;

providing a grinder supported on said hull and positioned at said discharge end of said conveyor, said grinder for receiving whole water hyacinth;

operating said grinder to cause severance of said water hyacinth from a unitary plant to a fibrous state wherein said plant constitute a fibrous mass with leaf and stalk matter shredded; and, providing a baler supported on said hull for receiving; and, baling said fibrous mass with said leaf and stalk and compacting said fibrous leaf and stalk mass into bales.

5. A method for the removal of water hyacinth growing from a floating disposition on water according to claim 4 and wherein:

tethering said bales upon discharge from said baler; and, jettisoning said tethered bales to said water body whereby a plurality of said bales are serially attached one another in a floating disposition.

6. A method for the removal of water hyacinth growing from a floating disposition on water according to claim 4 and wherein:

said means for tethering said bales includes a floating marker.

7. A method for the removal of water hyacinth growing from a floating disposition on water according to claim 5 and wherein:

towing said jettisoned bales to a shore location for disposal.

8. Apparatus for the removal of water hyacinths growing from a floating disposition on water comprising:

a grinder for receiving whole water hyacinth and causing severance of said water hyacinth from a unitary plant to a fibrous state wherein said plant constitute a fibrous mass with leaf and stalk matter shredded;

means for moving water hyacinths from said floating disposition on water to said grinder; and, a baler for receiving and baling said fibrous mass with said leaf and stalk and compacting said fibrous leaf and stalk mass into bales.

9. Apparatus for the removal of water hyacinths growing from a floating disposition on water according to claim 8 and further comprising:

said means for moving water hyacinths from said floating disposition on water to said grinder is mounted on land.

10. Apparatus for the removal of water hyacinths growing from a floating disposition on water according to claim 8 and further comprising:

said grinder for receiving whole water hyacinth and said baler for receiving and baling said fibrous mass is mounted on land.

11. A method for the removal of water hyacinth growing from a floating disposition on water comprising:

providing a grinder for receiving whole water hyacinth;

moving water hyacinth from said floating disposition on water to said grinder;

operating said grinder to cause severance of said water hyacinth from a unitary plant to a fibrous state wherein said plant constitute a fibrous mass with leaf and stalk matter shredded; and, baling and compacting said fibrous mass with said leaf and stalk matter shredded into bales.

12. A method for the removal of water hyacinth growing from a floating disposition on water according to claim 11 and further comprising:

adding sufficient weight to said bales to impart negative buoyancy to said bales.

13. A method for the removal of water hyacinth growing from a floating disposition on water according to claim 12 and further comprising:

said adding step includes adding weight to said bales to impart negative buoyancy during said baling.

14. A method for the removal of water hyacinth growing from a floating disposition on water according to claim 13 and further comprising:

adding sand bags to said bales.

\* \* \* \* \*